3,116,018
FOG NOZZLE
Michael Kunz, 8706 N. Olcott Ave., Niles, Ill.
Filed Sept. 10, 1962, Ser. No. 222,468
7 Claims. (Cl. 239—458)

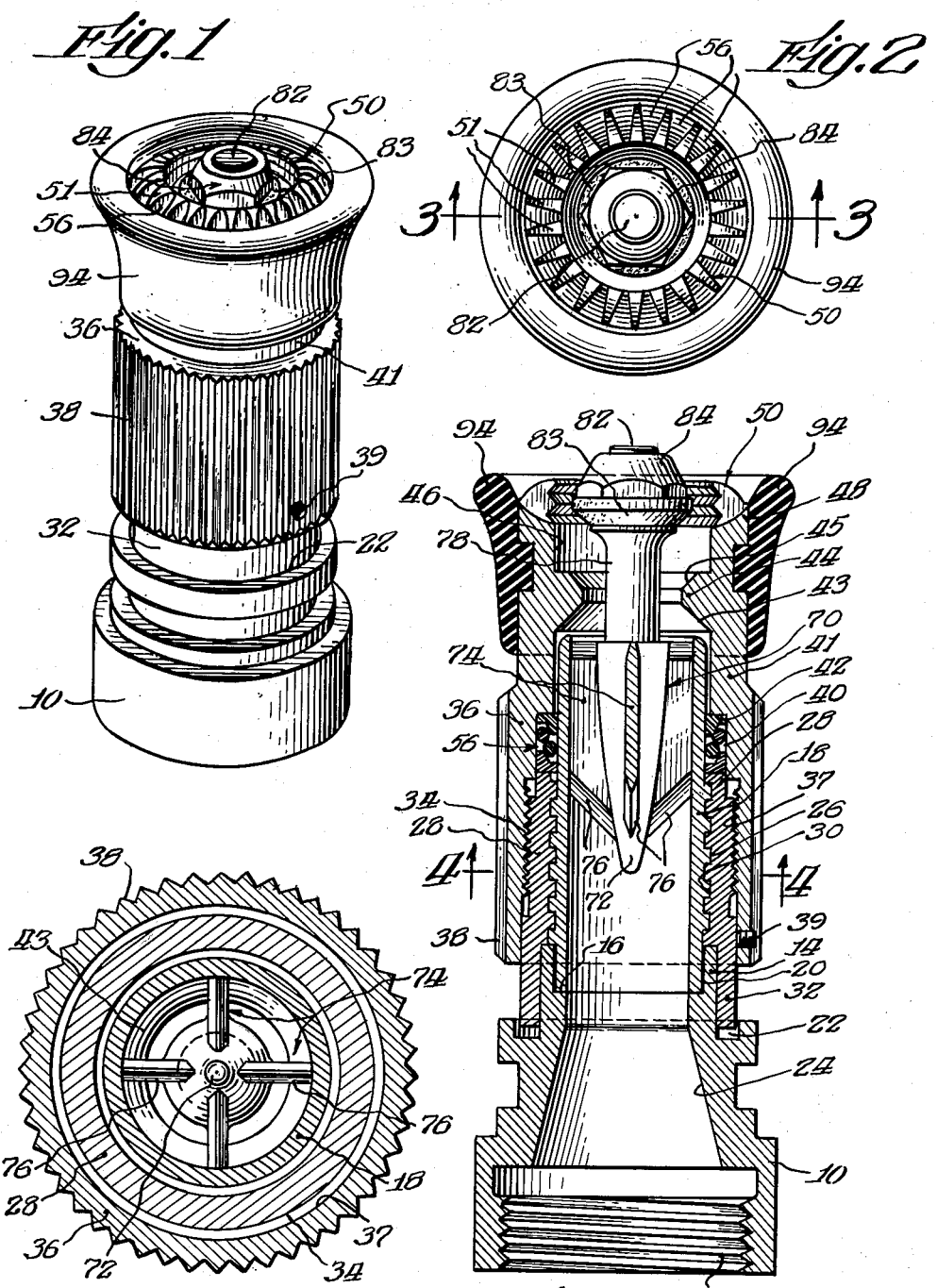

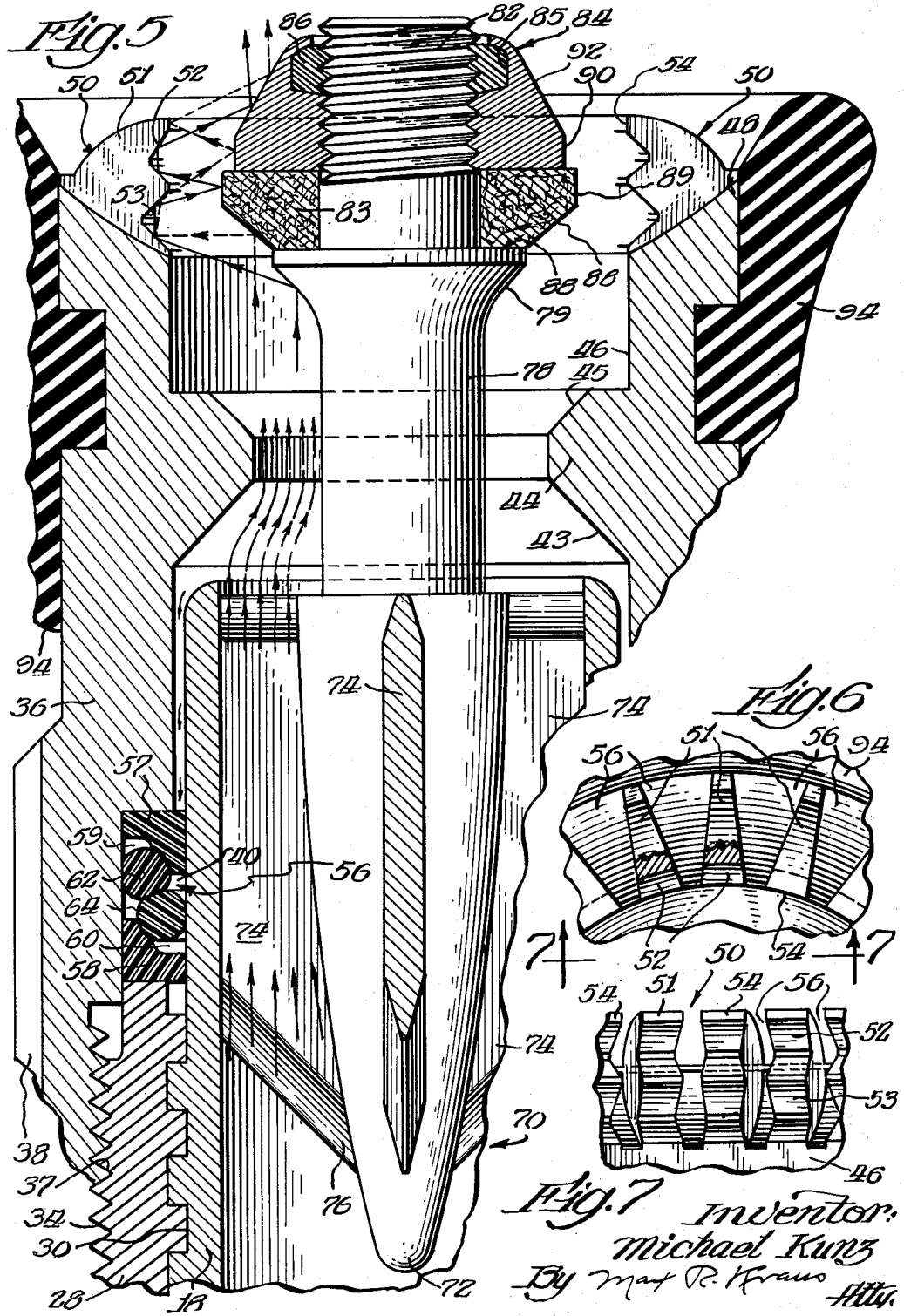

This invention relates to a fog nozzle, and more particularly to a variable jet stream fog nozzle used in combating fires.

One of the objects of this invention is to provide an effective and durable seal between the rotating and non-rotating members of the nozzle which will prevent any leak passage, yet will have low friction qualities so as not to interfere with the ease of rotation of the rotatable member.

Adjustable spray nozzles, commonly known as fog nozzles used in fire fighting, employ seals between the rotating and non-rotating parts of the nozzle, which are commonly O-rings made of rubber. These rubber O-rings have serious disadvantages and adversely offset the function of the fog nozzle. As the O-rings are radially compressed for proper sealing action they create high friction between the parts and make it difficult to revolve or rotate the rotating member of the nozzle relative to the non-rotating member, even in the absence of any fluid pressure. When the fluid pressure acts against the elastic rubber O-ring, the ring will yield and tend to extrude and wedge itself in the fluid passage between the rotatable and non-rotatable parts and it becomes difficult to rotate the rotatable member, such as the stream adjusting barrel relative to the non-rotatable body of the nozzle. When high pressures are required, it becomes virtually impossible for a fireman to rotate the rotatable barrel. To overcome this serious objection, present day nozzles incorporate separate shut-off valves as an integral part of the nozzle so that the fluid pressure which wedges the rubber O-ring between the aforementioned members of the nozzle is relieved, to thereby reduce the friction and make it possible to operate the nozzle.

Another disadvantage in the use of present day sealing means is that in sub-freezing temperatures the rubber rings become stiff and lose their elasticity and fail to perform any sealing function, thereby rendering the nozzle useless. Also, such rings are affected by aging and tend to dry out, losing their elasticity and requiring frequent replacement which is costly. Also, such rings are readily cut and torn by particles of sand, gravel and small sharp stones which frequently enter the fluid passage.

The foregoing disadvantages are eliminated by the use of the present invention which, as one of its objects, provides an effective seal without the disadvantages hereinbefore pointed out. Applicant's seal employs a pair of compression rings and a pair of Teflon O-rings, or a single compression ring and a Teflon O-ring, confined in a chamber between two sections of the stream adjusting barrel, which are secured together and rotate as a unit relative to the non-rotatable body. The said two sections of the stream adjusting barrel are adjustable relative to each other before being locked together as a unit and they cause the Teflon O-rings to expand radially inward and outward to provide an effective seal. As the ring wears, adjustment between the sections will further radially expand the rings and compensate for the wear.

Another object of this invention is to provide a structure having means for straightening and accelerating the velocity of the stream. With this invention turbulence is eliminated, the stream is straightened, thereby producing a farther reaching solid stream which holds together for a longer distance without the stream breaking apart, particularly in a strong wind.

Another object of this invention is to provide means which will deflect the water into the center of a conical spray pattern and break it up with fine particles to form a denser water-quenching spray into the center of a denser fog pattern.

Another object of this invention is to provide a nozzle which will throw a straight stream, as well as a varying angle of conical fog pattern.

Other objects and advantages will become apparent as this description progresses.

In the drawings:

FIG. 1 is a view of the nozzle.

FIG. 2 is a top plan view thereof.

FIG. 3 is a cross-sectional view taken on lines 3—3 of FIG. 2.

FIG. 4 is a sectional view taken on lines 4—4 of FIG. 3.

FIG. 5 is an enlarged sectional view of a portion of the nozzle as shown in FIG. 3, showing the direction of the flow of the water.

FIG. 6 is an enlarged plan view showing the teeth at the mouth of the nozzle, and FIG. 7 is a view taken from lines 7—7 of FIG. 6.

The nozzle comprises a pipe coupling member generally indicated at 10 which is internally threaded as at 12 at its outer end and which is adapted to be threadedly coupled to a water hose, which in turn is connected to a source of water supply, as is well understood.

The coupling member 10 has an inner tubular end 14 provided with a shoulder 16 within which is adapted to be received the end of the tubular member or body 18 of the nozzle. The end of said tubular member 18 is brazed as at 20 to the coupling member 10 to fixedly secure the tubular member 18 to the coupling member. The coupling member is also provided with an annular recess or groove 22 adapted to receive the end of the inner section of the adjusting barrel, to be described. The interior of the coupling member 10 tapers inwardly as at 24. The tubular member or body 18 is externally threaded as at 26.

Secured to said body 18 so as to be axially rotatable thereon is a tubular member which forms the inner section 28 of the rotatable portion of the nozzle. The tubular member or inner section is provided with internal threads 30 for engagement with the external threads 26 of the body 18. The inner section 28 has its inner end 32 extending over the inner tubular end 14 of the coupling member, as best seen in FIG. 3, with the inner end of said inner section extending into the recess or groove 22. The inner section 28 is provided with external threads 34.

Threadedly secured to said inner section 28 is the stream adjusting barrel generally designated by the numeral 36 which is provided with internal threads 37 engageable with the external threads 34 of the inner section 28. The stream adjusting barrel is provided with a knurled exterior surface 38 to be manually engaged for the purpose of gripping and rotating said stream adjusting barrel. The stream adjusting barrel forms the outer section of the rotatable portion of the nozzle and is secured in locked engagement with the inner section 28 by means of threaded bolts 39 engaging the inner section so that rotation of said stream adjusting barrel 36 will rotate with it, the inner section 28, and move the barrel 36 and inner section 28 axially with respect to the body 18. The stream adjusting barrel 36, outwardly of the internal threaded portion 37, is reduced in diameter to provide a space 40, and is further reduced in diameter to provide a wall section 41 with a shoulder 42. The interior of the barrel is further provided with an inwardly tapering portion 43, a short section 44 of reduced diameter, and an outwardly tapering portion 45. The mouth of the barrel has an enlarged annular section 46 which continues outwardly to form an outwardly flared end or tip 48.

A series of circumferentially spaced teeth generally designated at 50 are provided adjacent the top of selected 46 and the inner end of the end or tip 48. The teeth 50 are best shown in FIGS. 5, 6 and 7. Each tooth 51 has either one or a pair of V-shaped inner surfaces or V-shaped grooves. The upper V-shaped groove is designated at 52 and the lower V-shaped groove is designated at 53. All of the upper grooves 52 are in circumferential alinement and all of the lower grooves 53 are circumferentially alined. Each tooth has a short surface 54 which is parallel to the axis of the barrel. Spaces 56 are provided between the teeth. The teeth serve an important function, as will be more fully explained hereinafter.

In the space 40 between the barrel 36 and the inner section 28, sealing means are provided. The sealing means generally designated at 56 includes a pair of compression rings 57 and 58 which surround the tubular or body member 18 of the nozzle. The compression ring 57 is of generally inverted L-shape with the recessed portion 59 facing outwardly, with the side wall of the ring tapering inwardly. The other compression ring 58 is also L-shaped with the recessed portion 60 facing inwardly, with the side wall thereof tapering outwardly. The compression rings are formed preferably of Teflon but may also be formed of brass. A pair of O-rings 62 and 64 formed of Teflon are positioned between the two compression rings. The sealing means 56 prevents the water which would normally pass between the rotatable barrel and the body or tubular member 18 from passing into the threaded portions between the inner section and the tubular body. It will be appreciated that the adjusting barrel with the inner section fixed thereto is rotated with respect to the tubular body every time an adjustment of the barrel is made.

Unless an effective seal is provided the water will leak to the thread portion, which is highly undesirable. O-seals now commonly used are objectionable, as has been set forth in the objects, as they cause difficulty and at times impossibility in rotating or adjusting the barrel. With the sealing means herein provided, an effective seal which is not subject to the aforementioned objections is formed and a nozzle is provided which is easy to rotate and adjust. The compression rings compress the Teflon O-rings against each other and at the same time the compression ring 57 expands the O-ring 62 radially outwardly against the barrel 36, and the compression ring 58 extends the O-ring 64 radially inward against the body 18 and prevents any leakage of water into the threaded portions. Also, the Teflon O-rings are not subject to the other disadvantages pointed out with respect to rubber O-rings. If any wear should take place with respect to the compression rings and O-rings, such wear can be compensated for by adjusting the inner section inwardly relative to the barrel. This will cause a further radial expansion of the O-rings and will compensate for any wear.

A centerpiece generally designated by the numeral 70 is fixedly supported by the body member 18 within the waterway passage of the body member and within the mouth of the barrel. It includes a bullet-shaped section 72 which is supported within the tubular body by means of four radially extending fins or ribs 74 which extend to and are connected to the wall of the body member 18. The fins or ribs are qually spaced, as best shown in FIG. 4, and the lower or inner edges of the said ribs or fins which are the lead edges against which the water strikes, have their opposite walls tapered to merge and form knife-like edges 76 that help to prevent clogging of the waterway passage. The edges 76 of said ribs incline at an angle as best seen in FIG. 3. The nose of the bullet-shaped center section extends below the ribs, as the best seen in FIG. 3. Extending outwardly of the bullet-shaped section of the centerpiece and into the mouth of the barrel is a stem section 78 which flares outwardly as at 79 and provides a shoulder 80. Extending outwardly of the stem section is an externally threaded shank 82 formed integrally therewith.

A fiberglass washer 82 is supported on the shank portion and rests against the shoulder 80. A hexagonal or circular shaped nut 84 has an internal recess 85 which accommodates a fiber member 86 therewithin in threaded engagement with the threaded shank. The inner surface of the fiberglass washer 83 has a tapering wall surface 88 which continues with an annular surface 89 substantially parallel with the axis of the centerpiece. The hexagonal or circular nut 84 is also provided with an inner annular surface 90 which is generally parallel with the axis of the centerpiece, but which has a smaller diameter than the largest diameter of the gasket. The outer surface of the hexagonal-shaped nut has inwardly tapering sides 92. The outer or mouth end of the stream adjusting barrel is provided with a rubber collar 94 which is secured to the adjusting barrel. The outer end of said collar is shaped as best shown in section in FIG. 3 and extends slightly beyond the outer end of the barrel and serves as a bumper.

The centerpiece 70 straightens and accelerates the velocity of the stream of water and also eliminates turbulence. By straightening the stream of water and reducing the turbulence there is produced a farther reaching solid stream of water without the stream breaking apart, more particularly when the stream is directed in a strong wind. The stream has greater kinetic energy than streams produced by other nozzles now in use and holds together for a longer distance.

The construction of the teeth at the mouth or discharge end of the nozzle in combination with the means at the mouth end of the centerpiece will cause the stream of water to be deflected back and forth between the pairs of V-shaped teeth surfaces and the mouth end of the centerpiece, as indicated by the arrows in FIG. 5, which will result in finally deflecting the water into the center to form the conical spray pattern and will also break it up to fine particles to form a denser water-quenching spray. This is particularly useful when a conical fog pattern is required.

The nozzle is adjusted by manually rotating the barrel with respect to the body 18. This adjusts the mouth or discharge end of the barrel relative to the stem 78 and the parts on the end of the stem and provides the type of water stream desired. The nozzle may also be closed to prevent the discharge of the water stream by positioning the surface 45 of the barrel against the tapered surface 83 of the fiberglass washer.

It will be understood that various changes and modifications may be made from the foregoing without departing from the spirit and scope of the appended claims.

What is claimed is:

1. A fog nozzle comprising a coupling member for connecting the nozzle to a source of water supply, a body member secured to said coupling member, means positioned on said body member and axially rotatable relative thereto, said means comprising a barrel member and an inner member secured to each other and axially rotatable with respect to said body member, said barrel member having a mouth portion at its outer end, a plurality of teeth circumferentially positioned around the mouth of said barrel member, and sealing means positioned around said body member and between said barrel member and inner member, said barrel member being axially rotatable relative to said inner member, said sealing means including a compression ring and an O-ring.

2. A structure defined in claim 1 in which each of the teeth has a generally V-shaped configuration in vertical section and faces inwardly.

3. A structure defined in claim 1 in which each of the teeth is formed of a pair of V-shaped configurations in vertical section.

4. A structure defined in claim 1 in which the sealing means includes a pair of compression rings and a pair of O-rings positioned between said compression rings, with said O-rings being formed of Teflon material.

5. A fog nozzle comprising a coupling member for connecting the nozzle to a source of water supply, a body member fixedly secured to the coupling member, an outer member and an inner member axially rotatable together as a unit relative to said body member, said outer member having a mouth portion at its outer end, said outer and inner members being adjustable relative to each other and provided with means for holding said inner and outer members in fixed position relative to each other so that when said outer member is rotated said inner and outer members rotate relative to said body member as a unit, sealing means positioned around said body member and between said outer and inner members, said sealing means including a compression ring and an O-ring, means supported by said body member and extending into said body member, said means including a plurality of radially extending ribs connected to a centerpiece, said centerpiece extending outwardly of said body member and into the mouth of the outer member and provided with deflecting means for deflecting the stream of water, a plurality of teeth circumferentially positioned around said mouth, said teeth having a generally V-shaped configuration in vertical section and facing inwardly towards said centerpiece and being so constructed to deflect the stream of water towards the center.

6. A structure defined in claim 5 in which sealing means are provided around the body member and between the inner and outer members and said sealing means including a compression ring and an O-ring.

7. A fog nozzle comprising a coupling member for connecting the nozzle to a source of water supply, a tubular member fixedly secured to the coupling member and provided with external threads, an inner section provided with internal threads engaging the external threads on the tubular member and rotatable axially relative thereto, a barrel member provided with internal threads engaging the external threads on the inner section, means for securing the inner section and barrel member to each other so that rotation of said outer barrel member will simultaneously rotate the inner member relative to said tubular member, sealing means secured adjacent the tubular member and between said inner section and said barrel member, said sealing means comprising a pair of O-rings formed of Teflon and a pair of compression rings engaging said O-rings, a centerpiece extending into said tubular member, a plurality of ribs extending between said centerpiece and said tubular member and secured to said centerpiece and tubular member for supporting said centerpiece, said centerpiece including a generally bullet-shaped body, a stem extending outwardly of said bullet-shaped body and having an outwardly flared end within the mouth of the barrel member, a washer supported on said stem and having an outwardly tapering wall, a nut secured on said stem and having inwardly inclined tapering walls, said barrel member having a plurality of teeth at the mouth end of said barrel, each said tooth having its inner wall formed in a V-shaped configuration.

References Cited in the file of this patent

UNITED STATES PATENTS

| 1,922,519 | Armstrong | Aug. 15, 1933 |
| 2,125,978 | Arbogast | Aug. 9, 1938 |
| 2,313,994 | Grant | Mar. 16, 1943 |
| 2,552,445 | Nielsen | May 8, 1951 |
| 2,569,255 | Pagliuso | Sept. 25, 1951 |
| 2,763,514 | Hansen et al. | Sept. 18, 1956 |
| 2,795,462 | Bletcher et al. | June 11, 1957 |
| 2,914,257 | Wiant | Nov. 24, 1959 |
| 2,988,289 | Thompson | June 13, 1961 |

FOREIGN PATENTS

| 241,990 | Switzerland | Apr. 15, 1946 |
| 337,908 | France | Dec. 21, 1903 |
| 545,653 | Great Britain | Jan. 5, 1942 |